(12) United States Patent
Kim et al.

(10) Patent No.: US 11,890,848 B2
(45) Date of Patent: Feb. 6, 2024

(54) DISPLAY DEVICE AND METHOD FOR BONDING THE SAME

(71) Applicant: SAMSUNG DISPLAY CO., LTD., Yongin-si (KR)

(72) Inventors: Tae Hyun Kim, Seoul (KR); Seungmin Lee, Hwaseong-si (KR); Minjoo Kim, Bucheon-si (KR); Donghwan Shim, Hwaseong-si (KR); Jungkyu Lee, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/162,165

(22) Filed: Jan. 31, 2023

(65) Prior Publication Data

US 2023/0182460 A1 Jun. 15, 2023

Related U.S. Application Data

(62) Division of application No. 16/908,819, filed on Jun. 23, 2020, now Pat. No. 11,590,748.

(30) Foreign Application Priority Data

Aug. 19, 2019 (KR) ........................ 10-2019-0101302

(51) Int. Cl.
*B32B 37/12* (2006.01)
*B32B 3/28* (2006.01)
(Continued)

(52) U.S. Cl.
CPC ................ *B32B 37/12* (2013.01); *B32B 3/28* (2013.01); *B32B 7/12* (2013.01); *B32B 37/10* (2013.01);
(Continued)

(58) Field of Classification Search
CPC .. B32B 37/12; B32B 3/28; B32B 7/12; B32B 37/10; B32B 2457/20; H05K 5/0017
See application file for complete search history.

(56) References Cited

U.S. PATENT DOCUMENTS 10,336,005 B2 7/2019 Lee et al.
2014/0345792 A1 11/2014 Lee et al.
(Continued)

FOREIGN PATENT DOCUMENTS

CN 110092936 8/2019
KR 10-2017-0040439 4/2014
(Continued)

OTHER PUBLICATIONS

English machine translation of CN110092936A; Aug. 6, 2019; Yasui; 72 pages. (Year: 2019).*

*Primary Examiner* — Linda L Gray
(74) *Attorney, Agent, or Firm* — F. CHAU & ASSOCIATES, LLC

(57) ABSTRACT

A display device includes a window including a planar portion and a bending portion that is bent from the planar portion. A display module is disposed below the window. The display module includes a central portion overlapping the planar portion and an edge portion overlapping the bending portion. An adhesive member including an adhesive layer is disposed between the window and the display module. A lubrication layer overlaps at least a portion of the adhesive layer.

14 Claims, 17 Drawing Sheets

(51) Int. Cl.
    *B32B 7/12*       (2006.01)
    *B32B 37/10*    (2006.01)
    *H05K 5/00*     (2006.01)

(52) U.S. Cl.
    CPC ........ H05K 5/0017 (2013.01); *B32B 2457/20* (2013.01)

(56) References Cited

U.S. PATENT DOCUMENTS

| | | |
|---|---|---|
| 2017/0069879 A1 | 3/2017 | Um |
| 2017/0265340 A1 | 9/2017 | Son et al. |
| 2018/0072606 A1 | 3/2018 | Chou et al. |
| 2018/0150106 A1 | 5/2018 | Jang et al. |
| 2020/0057525 A1 | 2/2020 | Prest et al. |
| 2021/0053336 A1 | 2/2021 | Kim et al. |

FOREIGN PATENT DOCUMENTS

| | | |
|---|---|---|
| KR | 10-2015-0053084 | 5/2015 |
| KR | 10-2017-0029707 | 3/2017 |
| WO | WO 2014127557 | 8/2014 |

\* cited by examiner

DISPLAY DEVICE AND METHOD FOR BONDING THE SAME

CROSS-REFERENCE TO RELATED APPLICATIONS

This U.S. non-provisional patent application is a Division of co-pending U.S. patent application Ser. No. 16/908,819, filed on Jun. 23, 2020, which claims priority under 35 U.S.C. § 119 to Korean Patent Application No. 10-2019-0101302, filed on Aug. 19, 2019, the entire contents of which are hereby incorporated by reference.

TECHNICAL FIELD

The present disclosure relates to a display device, and more particularly, to a display device and a method for bonding the same.

DISCUSSION OF THE RELATED ART

Display devices are commonly used in mobile devices such as smart phones, tablet computers, laptop computers, digital cameras, camcorders, and portable information terminals or larger form electronic products such as televisions, computer monitors, and billboards.

Recently, some display devices have been designed to be flexible. By utilizing flexible display devices, the electronic devices that utilize these displays may be made in more desirable and convenient shapes and sizes. Particularly, some display devices have been designed to have a flat primary surface and then a rounded surface that is bent down from one or more sides of the flat primary surface. Such display devices may display an image through both the flat primary surface and the bent side surfaces.

SUMMARY

A display device includes a window including a planar portion and a bending portion that is bent from the planar portion. A display module is disposed below the window and includes a central portion at least partially overlapping the planar portion and an edge portion at least partially overlapping the bending portion. An adhesive member including an adhesive layer is disposed between the window and the display module and a lubrication layer overlaps at least a portion of the adhesive layer.

At least a portion of the lubrication layer may overlap the window exclusively between the bending portion and the edge portion.

The display device may further include an auxiliary lubrication layer disposed on a rear surface of the window facing the adhesive member.

The auxiliary lubrication layer may overlap the window exclusively between the bending portion and the edge portion.

The bending portion may include first and second bending portions, which are bent from opposite ends of the planar portion in a first direction.

The bending portion may further include third and fourth bending portions, which are respectively bent from opposite ends of the planar portion in a second direction that is perpendicular to the first direction.

The edge portion may include first and second edge portions that are respectively bent from one end and the other end of the central portion in the first direction. Third and fourth edge portions may be respectively bent from one end and the other end of the central portion in the second direction. The first to fourth edge portions may at least partially overlap the first to fourth bending portions, respectively.

The lubrication layer may include oil.

The window may define a display area that includes pixels to display an image. The display area may include a first display area corresponding to the planar portion and a second display area corresponding to the bending portion. The display module may display a first image through the first display area and may display a second image different from the first image through the second display area.

A method for bonding a display device includes disposing a display substrate including a central portion and an edge portion adjacent to the central portion on a pad disposed on a stage. A lubrication layer is formed on the display substrate. An adhesive layer is formed on the lubrication layer. A window substrate including a planar portion and a bending portion that is bent from the planar portion is provided. The window substrate is aligned with the display substrate so that the window substrate and the display substrate face each other tor face away from each other). The adhesive layer is attached to the window substrate. Heat is applied to the adhesive layer. Viscosity of the adhesive layer increases during a period for which a temperature of the adhesive layer increases from a first temperature to a second temperature.

The central portion may be pressed through the pad that is disposed between the display substrate and the stage.

The method may further include ejecting air through a plurality of opening defined in a top surface of the stage, adjacent to the pad. The edge portion may be pressed through an elastic film, which at least partially surrounds the pad and the openings. The elastic film is disposed between the stage and the display substrate, and is expanded by the ejected air.

The edge portion may be pressed through a roller disposed on the stage, adjacent to the pad.

The lubrication layer may be absorbed to the adhesive layer after a predetermined period of time.

The predetermined period may be before a time at which the beat is applied to the adhesive layer.

The method may further include pressing the display substrate through the pad disposed between the display substrate and the stage. The pressing of the display substrate through the pad may include pressing the display substrate through the pad. The display substrate may be pressed at a first intensity for the first period. The display substrate may be pressed at a second intensity greater than the first intensity for a second period of time that occurs after the first period of time.

A viscosity intensity of the adhesive layer may increase from the first intensity to the second intensity.

The viscosity intensity of the adhesive layer may range of 1 gf/inch to 30 gf/inch at the first temperature, and the viscosity intensity of the adhesive layer may range of 300 gf/inch to 3,000 gf/inch at the second temperature.

The method may further include forming an auxiliary lubrication layer on a rear surface of the window substrate facing the display substrate.

A method for bonding a display device includes providing a window substrate including a planar portion and a bending portion that is bent from the planar portion. A first lubrication layer is formed on a rear surface of the window substrate. A display substrate, including a central portion and an edge portion adjacent to the central portion, is disposed on a pad disposed on a stage. An adhesive member including an adhesive layer and a second lubrication layer is formed on the display substrate. The central portion is attached to the planar portion. The edge portion is attached to the bending portion.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
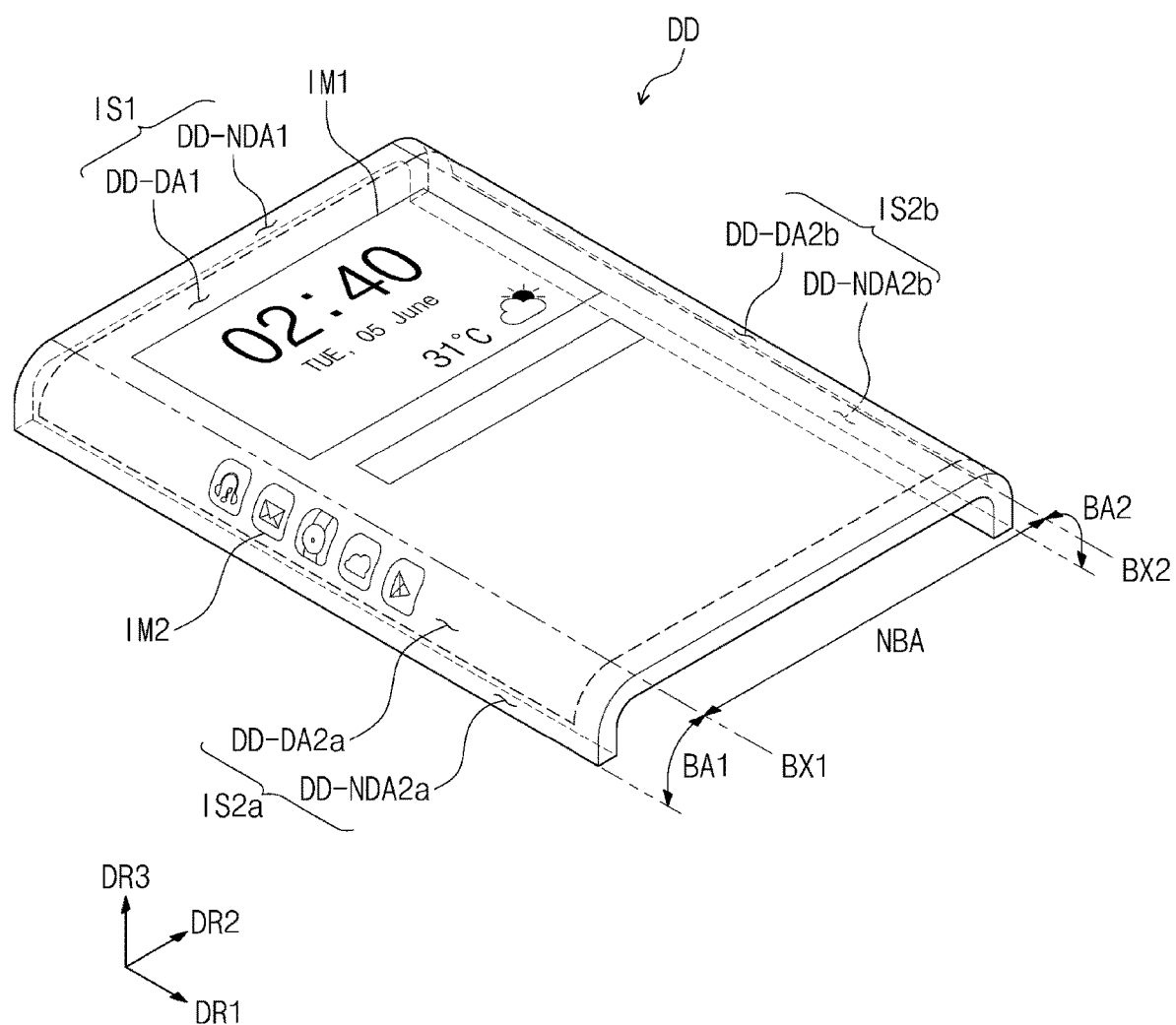
FIG. 1A is a perspective view illustrating a display device according to an exemplary embodiment of the inventive concept.

In this specification, it will also be understood that when one component (or region, layer, portion) is referred to as being "on", "connected to", or "coupled to" another component, it can be directly disposed/connected/coupled on/to the one component, or an intervening third component may also be present.

Like reference numerals may refer to like elements throughout the specification and the drawings. Also, in the figures, the thickness, ratio, and dimensions of components may be exaggerated for clarity of illustration. However, the relative dimensions and angles shown in the figures are understood to be representative of at least one exemplary embodiment of the present invention.

The term "and/or" includes any and all combinations of one or more of the associated listed items.

It will be understood that although the terms such as 'first' and 'second' are used herein to describe various elements, these elements should not necessarily be limited by these terms. The terms may be used to distinguish one component from other components. For example, a first element referred to as a first element in one embodiment can be referred to as a second element in another embodiment without departing from the scope of the present disclosure. The terms of a singular form mays include plural forms unless otherwise stated.

Also, ""under", "below", "above', "upper", and the like may be used for explaining relation association of components illustrated in the drawings. The terms may be a relative concept and described based on directions expressed in the drawings.

The meaning of "include" or "comprise" specifies a property, a fixed number, a step, an operation, an element, a component or a combination thereof, but does not exclude other properties, fixed numbers, steps, operations, elements, components or combinations thereof. However, the phrase "consisting of" is meant to exclude components other than what is being listed.

Hereinafter, exemplary embodiments of the inventive concept will be described with reference to the accompanying drawings.

Figure 1B:
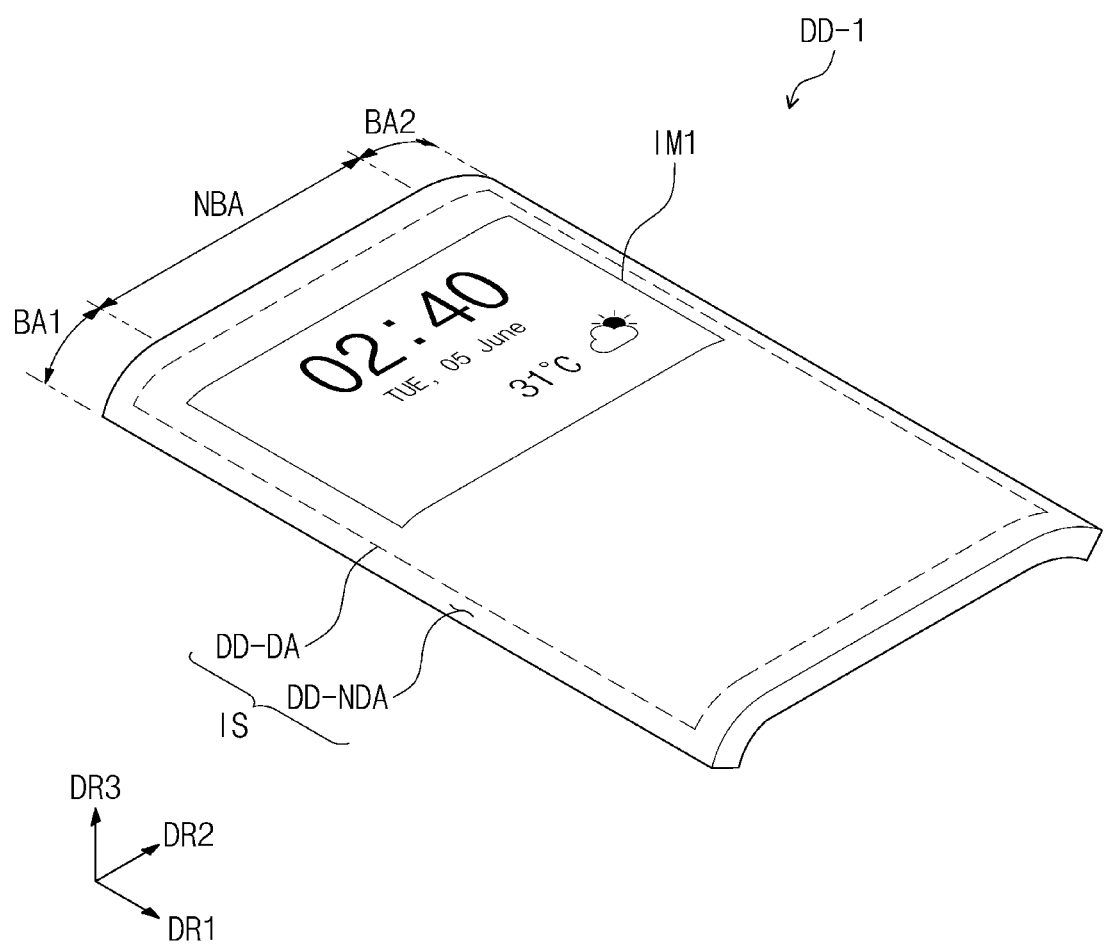
FIG. 1B is a perspective view illustrating a display device according to an exemplary embodiment of the inventive concept.
Figure 1C:
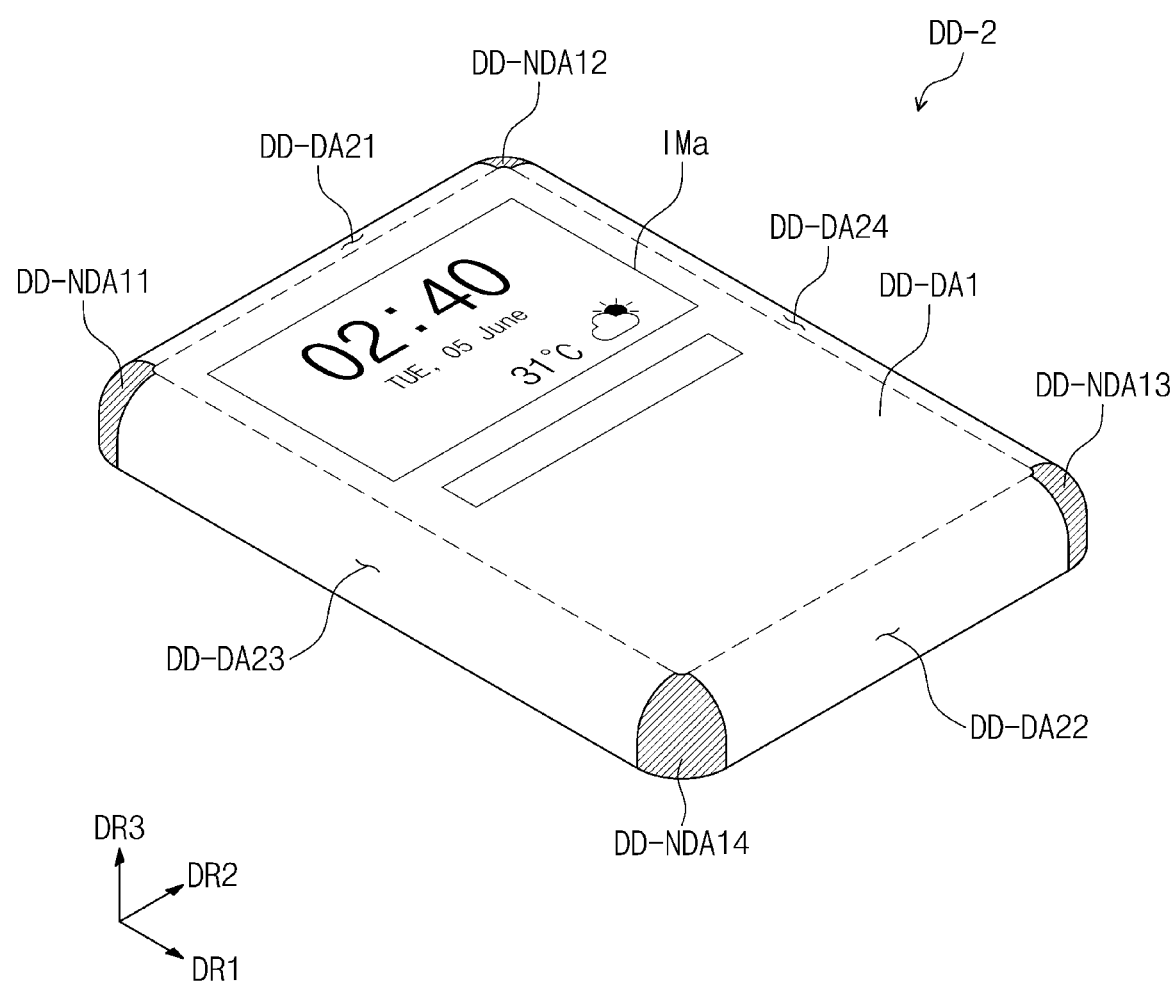
FIG. 1C is a perspective view illustrating a display device according to an exemplary embodiment of the inventive concept.

FIG. 1A is a perspective view illustrating a display device according to an exemplary embodiment of the inventive concept. FIG. 1B is a perspective view illustrating a display device according to an exemplary embodiment of the inventive concept. FIG. 1C is a perspective view illustrating a display device according to an exemplary embodiment of the inventive concept.

Referring to FIG. 1A, a display device DD may include a planar area NBA and first and second bending areas BA1 and BA2 that are bent from the planar area NBA. As used herein, the phrase "A and B are bent from X" means that each of A and B are connected to X and are continuous with X but are bent away from a plane in which X is disposed within. Each of the first bending area BA1 and the second bending area BA2 may be bent from the planar area NBA in the same direction. The first bending area BA1 is bent about a first bending axis BX1, and the second bending area BA2 is bent about a second bending axis BX2. The planar area NBA may correspond to a front surface of the display device DD, and the first bending area BA1 and the second bending area BA2 may correspond to side surfaces of the display device DD.

According to an exemplary embodiment of the inventive concept, the planar area NBA includes a first display surface IS1, the first bending area BA1 includes a second display surface IS2a, and the second bending area BA2 includes a third display surface IS2b.

The first display surface IS1 of the planar area NBA includes a first display area DD-DA1 and a first bezel area DD-NDA1 adjacent to the first display area DD-DA1. Hereinafter, the display area is defined as an area on which an image is displayed, and the bezel area is defined as an area on which an image is not displayed. However, the bezel area may be provided in various colors through a printed layer that is printed with a permanent pigmentation.

The planar area NBA may be a surface defined by a first direction DR1 and a second direction DR2. A normal direction of the display device DD is indicated in a third direction DR3. In this specification, "when viewed on a plane or on the plane" may mean a case when viewed in the third direction DR3. A front surface (or a top surface) and a rear surface (or a bottom surface) of each of layers or units, which will be described below, are distinguished by the third direction DR3. However, directions indicated as the first to third directions DR1, DR2, and DR3 may be a relative concept and thus be changed into different directions, for example, opposite directions.

The second display surface IS2a of the first bending area BA1 includes a second display area DD-DA2a and a second bezel area DD-NDA2a adjacent to the second display area DD-DA2a. The second display surface IS2a may be bent from one side of the first display surface IS1 about the first bending axis BX1 in the second direction DR2.

The third display surface IS2b of the second bending area BA2 includes a third display area DD-DA2b and a third bezel area DD-DA2a adjacent to the third display area DD-DA2b. The third display surface IS2b may be bent from the other side of the first display surface IS1 along, the second bending axis BX2 in the second direction DR2.

Each of the first to third display areas DD-DA1, DD-DA2a, and DD-DA2b may display an image. For example, as illustrated in FIG. 1A, the first display area DD-DA1 displays a first image IM1 having a watch window shape, and the second display area DD-DA2a displays a second image IM2 having an emoticon shape. The third display area DD-DA2b may also display a third image. The first to third images may be one same image or different images. Aa used herein, the phrase "configured to display an image" or "display an image" may mean that display pixels are disposed within these areas.

However, the technical idea of the inventive concept is not limited thereto. For example, the images, which are respectively displayed on the first to third display areas DD-DA1, DD-DA2a, and DD-DA2b, may be connected to each other to display one uninterrupted image.

Also, although the first to third bezel areas DD-NDA1, DD-NDA2a, and DD-NDA2b are illustrated through FIG. 1A, at least one or all of the first to third bezel areas DD-NDA1, DD-NDA2a, and DD-NDA2b may be omitted.

Referring to FIG. 1B, when compared to the display device DD of FIG. 1A, a display device DD-1 may include a first bending area BA1 and a second bending area BA2, which are respectively bent at different angles from one side and the other side of the planar area NBA in the second direction DR2. For example, when compared to the first bending area BA1 and the second bending area BA2 of FIG. 1A, the first bending area BA1 and the second bending area BA2 of FIG. 1B may be respectively bent at relatively small angles (e.g. acute angles) from one side and the other side of the planar area NBA.

Also, the display device DD-1 may display one image IM through the planar area NBA, the first bending area BA1, and the second bending area BA2.

Referring to FIG. 1C, a display device DD-2 includes a main display area DD-DA1 and first to fourth display areas DD-DA21, DD-DA22, DD-DA23, and DD-DA24, which are bent from the main display area DD-DA1. The main display area. DD-DA1 may correspond to an entire front surface of the display device DD-2, and the first to fourth display areas DD-DA21, DD-DA22, DD-DA23, and DD-DA24 may correspond to side surfaces of the display device DD-2.

The first display area DD-DA21 and the second display area DD-DA22 may face each other (or face away from each other) in the first direction DR1 and be respectively bent from one side and the other side of the train display area DD-DA1 in the first direction DR1. The third display area DD-DA23 and the fourth display area DD-DA24 may face each other (or face away from each other) in the second direction DR2 and be respectively bent from one side and the other side of the main display area. DD-DA1 in the second direction DR2.

Also, the display device DD-2 may include first to fourth bezel areas DD-NDA11, DD-NDA12, DD-NDA13, and DD-NDA14. The first to fourth bezel areas DD-NDA11, DD-NDA12, DD-NDA13, and DD-NDA14 may correspond to side surfaces of the display device DD-2.

The first bezel area DD-NDA11 is disposed between the first display area DD-DA21 and the third display area DD-DA23. The second bezel area DD-NDA12 is disposed between the first display area DD-DA21 and the fourth display area DD-DA24. The third bezel area DD-NDA13 is disposed between the second display area DD-DA22 and the fourth display area DD-DA24. The fourth bezel area DD-NDA14 is disposed between the second display area DD-DA22 and the third display area DD-DA23.

According to an exemplary embodiment of the inventive concept, the main display area DD-DA1 may have a planar shape that is within a plane defined in the first direction DR1 and the second direction DR2. Each of first to fourth edge display areas DD-DA21, DD-DA22, DD-DA23, and DD-DA24 and first to fourth bezel areas DD-NDA11, DD-NDA12, DD-NDA13, and DD-NDA14 may have a curved shape that is bent from the main display area DD-DA1.

Figure 2A:
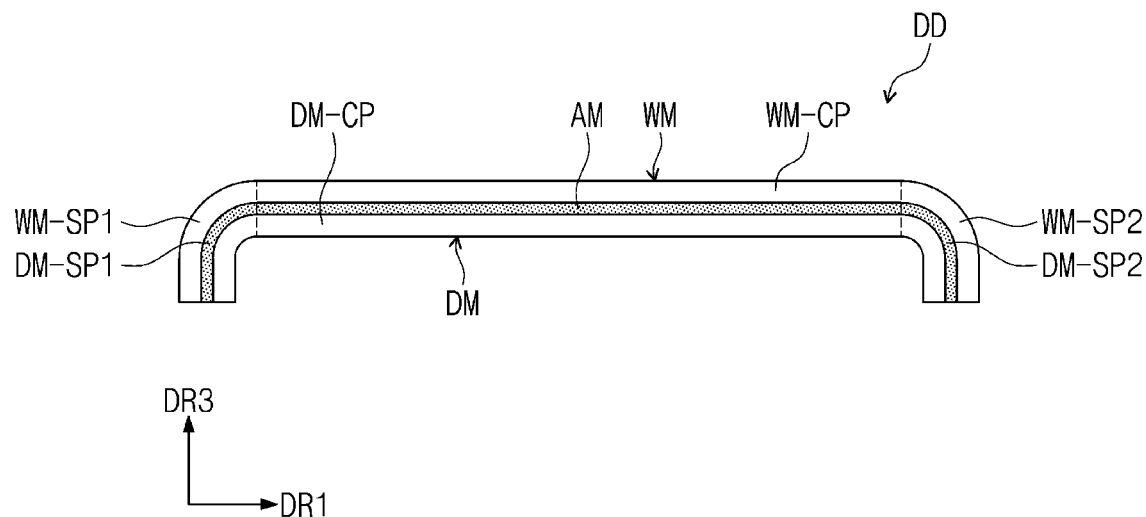
FIG. 2A is a cross-sectional view illustrating a display device according to an exemplary embodiment of the inventive concept.
Figure 2B:
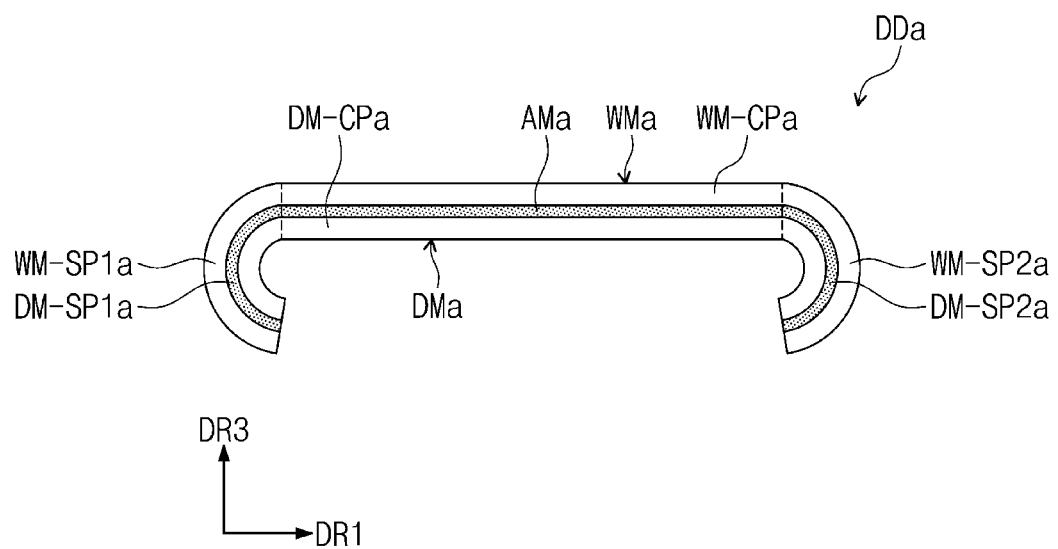
FIG. 2B is a cross-sectional view illustrating a display device according to an exemplary embodiment of the inventive concept.

FIG. 2A is a cross-sectional view illustrating a display device according to an exemplary embodiment of the inventive concept. FIG. 2B is a cross-sectional view illustrating a display device according to an exemplary embodiment of the inventive concept.

Referring to FIG. 2A, a display device DD may include a window WM, a display module DM, and an adhesive member AM.

The window WM may be attached to a front surface of the adhesive member AM. An image may be visible on the display device DD through the window. According to an exemplary embodiment of the inventive concept, the window WM may be a substrate. The substrate may include a plastic substrate, a glass substrate, or an organic/inorganic composite substrate. Alternatively, the substrate may have a laminated structure including a plurality of insulation layers. The plastic substrate may include an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-hosed resin, and/or a perylene-based resin.

The adhesive member AM may be disposed between the window WM and the display module DM. The adhesive member AM is a double-sided adhesive and may fix the window WM and the display module DM. For example, the adhesive member AM may be an optically clear adhesive film (OCA), an optically clear resin (OCR), and/or a pressure sensitive adhesive film (PSA). Hereinafter, in this specification, the adhesive member AM is described as being an optically transparent adhesive film OCA.

The display module DM may be attached to a rear surface of the adhesive member AM. The display module DM may include a display panel that outputs an image and an input sensing layer that senses an external touch (e.g. a touch-sensing layer). Any kind of display panel may be used. For example, the display panel may be an organic light emitting diode (OLED) display panel and/or a quantum-dot light emitting display panel. A light emitting layer of the organic light emitting diode display panel includes an organic light emitting material. A light emitting layer of the quantum-dot light emitting display panel includes a quantum dot and a quantum rod.

The input sensing layer may sense an input applied from the outside. The input applied from the outside may be provided in various manners. For example, the external input includes various types of external inputs such as a portion of user's body, a stylus pen, light, heat, a pressure, or the like. Also, an input through contact with the portion of the human body such as user's hands as well as adjacent or neighboring space touches (for example, hovering) may also be one form of the input.

According to an exemplary embodiment of the inventive concept, the display module DM may be provided as a flexible substrate that is capable of being curved or bent, at least once. In some embodiments, the input sensing layer may be omitted.

According to an exemplary embodiment of the inventive concept, the window WM includes a planar portion WM-CP and first and second bending portions WM-SP1 and WM-SP2, which are bent from the planar portion WM-CP to face each other (or to face away from each other) in the first direction DR1. As illustrated in FIG. 2A, an angle between each of the first and second bending portions WM-SP1 and WM-SP2 and the planar portion WM-CP may be about 90 degrees. For example, the angle may be within a range of from 70 degrees to 110 degrees, a range of from 80 to 100, or a range of from 88 to 92 degrees. However, the inventive concept is not limited thereto. For example, the angle between the bending portion and the planar portion of the window maybe greater than 100 degrees or less than 70 degrees.

The planar portion WM-CP of the window WM may at least partially overlap the planar area NBA illustrated in FIG. 1A, and the first bending portion WM-SP1 and the second bending portion WM-SP2 may at least partially overlap the first and second bending areas BA1 and BA2, respectively.

The window WM may further include third and fourth bending portions that are bent from the planar portion WM-CP to face each other (or to face away from each other) in the second direction DR2. In this case, the first to fourth bending portions of the window WM may correspond to the first to fourth display areas illustrated in FIG. 1C.

The display module DM includes a central portion DM-CP and first and second edge portions DM-SP1 and DM-SP2, which are each bent from the central portion DM-CP to face each other (or away from each other) in the first direction DR1. The central portion DM-CP of the display substrate DM may at least partially overlap the planar area NBA illustrated in FIG. 1A, and the first edge portion DM-SP1 and the second edge portion DM-SP2 may at least partially overlap each other the first bending area BA1 and the second bending area BA2, respectively.

Referring to FIG. 2B, according to an exemplary embodiment, a structure in which an angle between each of a first bending portion WM-SP1a and a second bending portion WM-SP2a of a window WMa and a planar portion WM-CPa is about 90 degrees or more is illustrated. As a result, an angle between each of a first edge portion DM-SP1a and a second edge portion DM-SP2a of the display module DMa and a central portion DM-CPa may be about 90 degrees or more (e.g. from 80 degrees and more). An adhesive member AMa may be disposed between the window WMa and the display module DMa, which are illustrated in FIG. 2B, so as to fix the window WMa and the display module DMa to each other.

In this specification, the window may be described as a window substrate, and the display module may be described as a display substrate.

Figure 3:
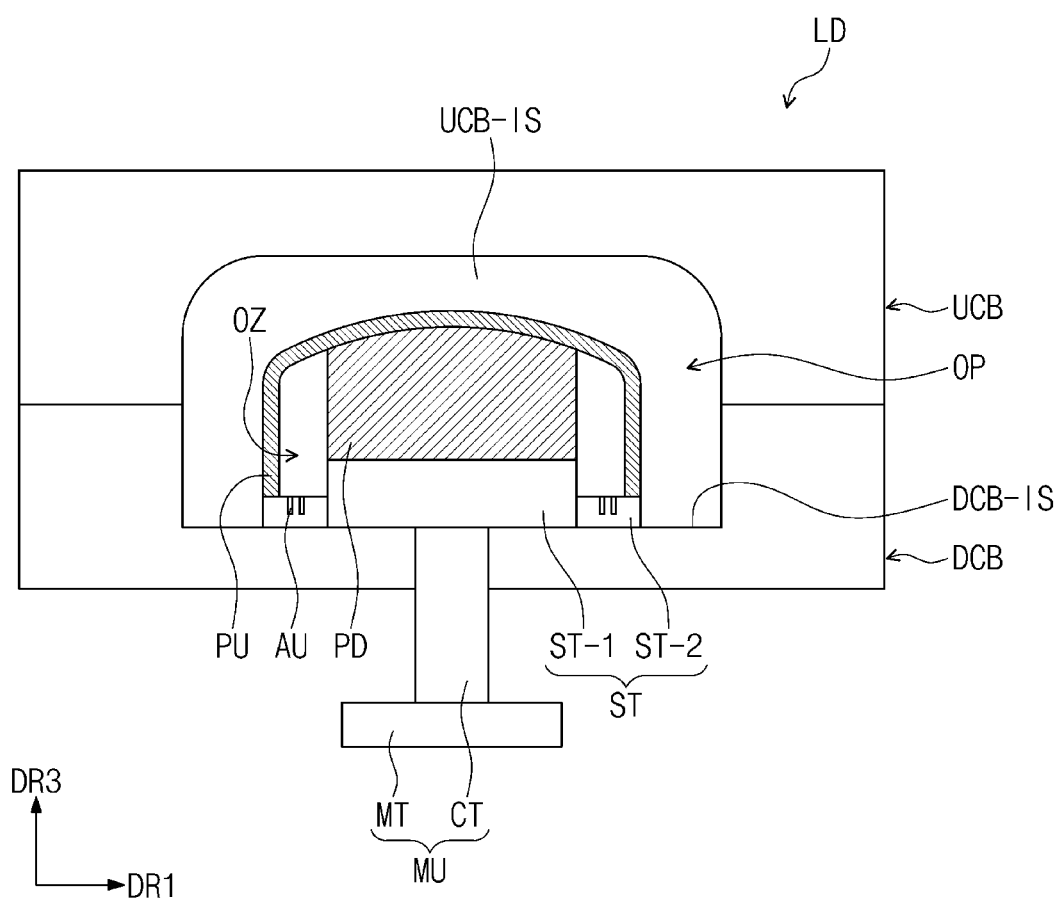
FIG. 3 is a cross-sectional view illustrating a bonding device according to an exemplary embodiment of the inventive concept.

FIG. 3 is a cross-sectional view illustrating a bonding device according to an exemplary embodiment of the inventive concept.

Referring to FIG. 3, a bonding device LD includes an upper chamber UCB, a lower chamber DCB, a support member MU, a stage ST, a pad PD, and an elastic film PU.

The upper chamber UCB may include a seating surface UCB-IS on which the window WM is disposed. The seating surface UCB-IS may be defined as an inner surface of the upper chamber UCB. The seating surface UCB-IS may have a surface that corresponds to that of the window WM including the planar portion WM-P, the first bending portion WM-SP1, and/or the second bending portion WM-SP2.

The lower chamber DCB may be coupled to the upper chamber UCB. As the lower chamber DCB and the upper chamber UCB are coupled to each other, an internal space OP may be defined between the lower chamber DCB and the upper chamber UCB. The internal space OP represents an actual space in which a bonding process between the window WM and the display module DM is performed. The internal space OP may be maintained in a vacuum state due to the coupling of the lower chamber DCB and the upper chamber UCB. Also, at least one hole into which the support member MU is inserted may be defined in the lower chamber DCB.

Each of the stage ST, the pad PD, and the elastic film PU may be disposed in the internal space OP. Also, the window WM and the display module DM that are molded by the bonding device LD may also be disposed in the internal space OP.

The stage ST may be disposed on a seating surface DCB-IS of the lower chamber DCB. The seating surface DCB-IS of the lower chamber DCB may face the seating surface UCB-IS of the upper chamber UCB. The stage ST may be divided into a first portion ST-1 and a second portion ST-2 adjacent to the first portion ST-1.

On a plane, the first portion ST-1 may have an area greater than that of the second portion ST-2. For example, the second portion ST-2 may surround the first portion ST-1 on the plane. Also, the first portion ST-1 in the third direction DR3 may have a thickness greater than that of the second portion ST-2. However, the inventive concept is not limited thereto. For example, the first portion ST-1 and the second portion ST-2 may have the same thickness. In this case, the stage ST may also have a uniform thickness that may be the same as the thickness of each of the first and second portions ST-1 and ST-2.

The pad PD may be disposed on the stage ST corresponding to the first portion ST-1. According to an exemplary embodiment of the inventive concept, the pad PD may include an elastic material. For example, the pad PD may be made of a natural or synthetic rubber or silicone, and a type thereof is not particularly limited.

According to an exemplary embodiment of the inventive concept, a plurality of openings AU may be defined in a top surface of the stage ST corresponding to the second portion ST-2. According to an exemplary embodiment of the inventive concept, air may be injected into an internal space OZ, which is defined by the elastic film PU, the pad PD, and the stage ST, through the openings AU. The openings AU defined in the stage ST corresponding to the second portion ST-2 might not overlap the pad PD on the plane.

The support member MU includes a movable part CT and a control part MT coupled to the movable part CT. The movable part CT may be inserted into a hole defined in the lower chamber DCB and connected to a bottom surface of the stage ST. According to an exemplary embodiment, the movable part CT is free to move along the third direction DR3 under the control of the control part MT. For example, since the movable part CT vertically lifts the first portion ST-1 of the stage ST along the third direction DR3 under the control of the controller MT, the pad PD may ascend along the third direction DR30.

The elastic film PU may at least partially surround the openings AU and the pad PD and may be disposed on the second portion ST-2 of the stage ST. According, to exemplary embodiments of the inventive concept, the elastic film PU may be provided as an elastic film and deformable by an external pressure. For example, the elastic film PU may be provided as a diaphragm that is capable of being expanded and contracted according to the external pressure or may be provided as a rubber plate having high elongation and durability. For example, the elastic film PU may be provided as a film having a variety of forms capable of being expanded in volume due to the elongation, and the type of elastic film PU is not particularly limited.

Figure 4A:
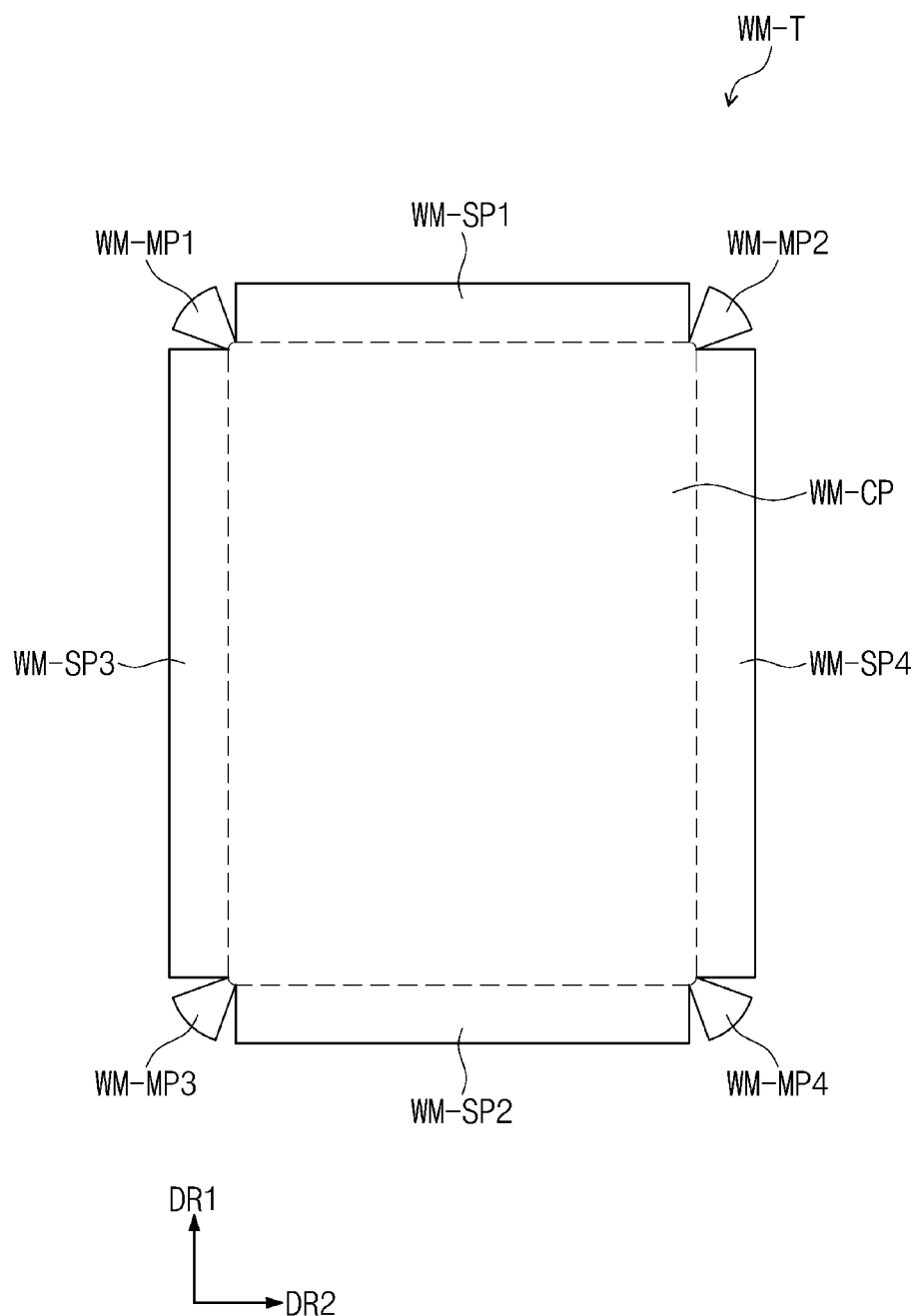
FIG. 4A is a plan view illustrating a window before being bent according to an exemplary embodiment of the inventive concept.
Figure 4B:
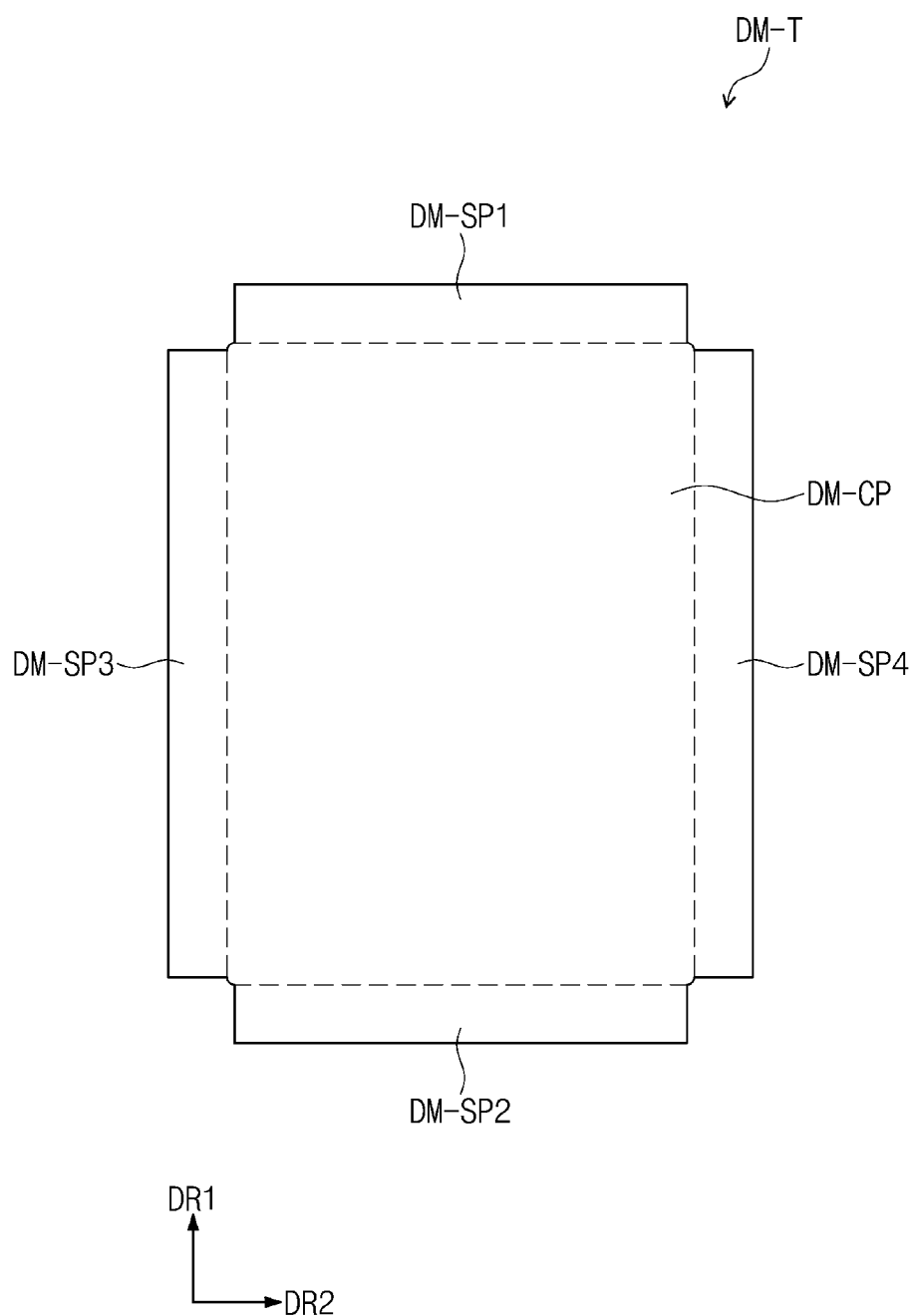
FIG. 4B is a plan view illustrating a display module before being bent according to an exemplary embodiment of the inventive concept.

FIG. 4A is a plan view illustrating the window before being bent according to an exemplary embodiment of the inventive concept. FIG. 4B is a plan view illustrating the display module before being bent according to an exemplary embodiment of the inventive concept.

FIGS. 4A and 4B illustrate shapes of the window WM-T and the display module DM-T before being molded. For example, the window WM-T and the display module DM-T may have shapes before the bending portions WM-SP1 to WM-SP4 of the window WM-T and the edge portions DM-SP1 to DM-SP4 of the display module DM-T are bent, respectively. Hereinafter, for convenience of description, the window WM is described as the window substrate, and the display module DM is described as the display substrate.

Referring to FIG. 4A, the window substrate WM-T includes a planar portion WM-CP, first to fourth bending portions WM-SP1 to WM-SP4, and corner bending portions WM-MP1 to WM-MP4.

The planar portion WM-CP may be in a plane defined by the first direction DR1 and the second direction DR2. For example, the planar portion WM-CP does not have a bent or curved shape.

The first bending portion WM-SP1 and the second bending portion WM-SP2 may be adjacent to one side and the other side of the planar portion WM-CP in the first direction DR1, respectively. The first bending portion WM-SP1 and the second bending portion WM-SP2 may face each other (or face away from each other) in the first direction DR1. The third bending portion WM-SP3 and the fourth bending portion WM-SP4 may be adjacent to one side and the other side of the planar portion WM-CP in the second direction DR2, respectively. The third bending portion WM-SP3 and the fourth bending portion WM-SP4 may face each other (or face away from each other) in the second direction DR2.

The first to fourth bending portions WM-SP1 to WM-SP4 may be integrated with the planar portion WM-CP.

The first corner bending portion WM-MP1 may be disposed between the first bending portion WM-SP1 and the third bending portion WM-SP3 and may be adjacent to a first corner of the planar portion WM-CP. The second corner bending portion WM-MP2 may be disposed between the first bending portion WM-SP1 and the fourth bending portion WM-SP4 and may be adjacent to a second corner of the planar portion WM-CP. The first and second corners may face each other (or face away from each other) in the second direction DR2.

The third corner bending portion WM-MP3 may be disposed between the third bending portion WM-SP3 and the second bending portion WM-SP2 and may be adjacent to a third corner of the planar portion WM-CP. The fourth corner bending portion WM-MP4 may be disposed between the second bending portion WM-SP2 and the fourth bending portion WM-SP4 and may be adjacent to a fourth corner of the planar portion WM-CP. The third corner faces (or face away from the fourth corner in the second direction DR2 and faces (or face away from) the first corner in the first direction DR1. The fourth corner faces (or face away from) the second corner in the first direction DR1.

The first to fourth corner bending portions WM-MP1 to WM-MP4 may be integrated with the planar portion WM-CP.

According to an exemplary embodiment of the inventive concept, the first to fourth bending portions WM-SP1 to WM-SP4 and the first to fourth corner bending portions WM-MP1 to WM-MP4 may be bent from the planar portion WM-CP by the bonding device LD of FIG. 3.

Referring to FIG. 4B, the display substrate DM-T includes a central portion DM-CP and first to fourth edge portions DM-SP1 to DM-SP4. The central portion DM-CP may be parallel to a surface defined by the first direction DR1 and the second direction DR2. For example, the central portion DM-CP does not have a bent or curved shape.

The first edge portion DM-SP1 and the second edge portion DM-SP2 may be adjacent to one side and the other side of the central portion DM-CP in the first direction DR1, respectively. The first edge portion DM-SP1 and the second edge portion DM-SP2 may face each other (or face away from each other) in the first direction DR1. The third edge portion DM-SP3 and the fourth edge portion DM-SP4 may be adjacent to one side and the other side of the central portion DM-CP in the second direction DR2, respectively. The third edge portion DM-SP3 and the fourth edge portion DM-SP4 may face each other (or face away from each other) in the second direction DR2.

The first to fourth edge parts DM-SP1 to DM-SP4 may be integrated with the central portion DM-CP.

According to an exemplary embodiment of the inventive concept, the first to fourth edge portions DM-SP1 to DM-SP4 may be bent from the central portion DM-CP by the bonding device LD of FIG. 3. Also, according to an exemplary embodiment, the display substrate DM may include corner portions corresponding to the first to fourth corner bending portions WM-MP1 to WM-MP4 illustrated in FIG. 4A.

Figure 5:
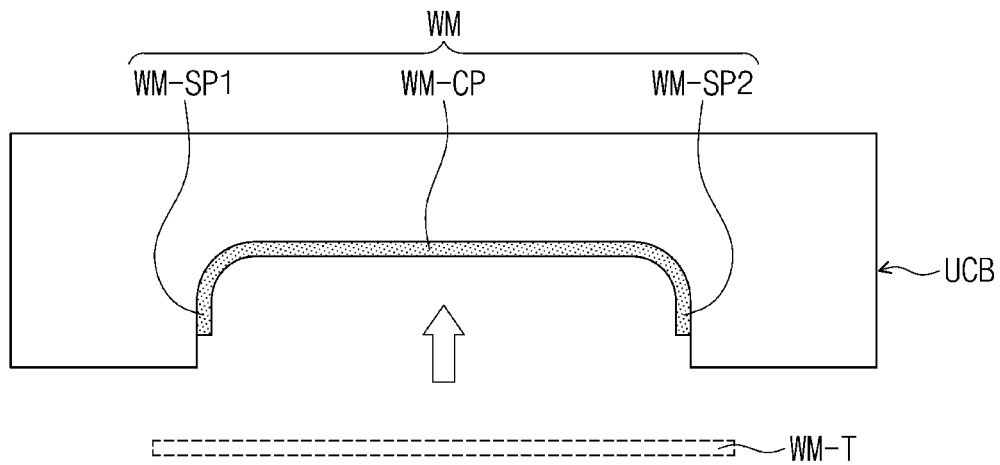
FIG. 5 is a cross-sectional view illustrating an upper chamber of the bonding device according to an exemplary embodiment of the inventive concept.
Figure 6:
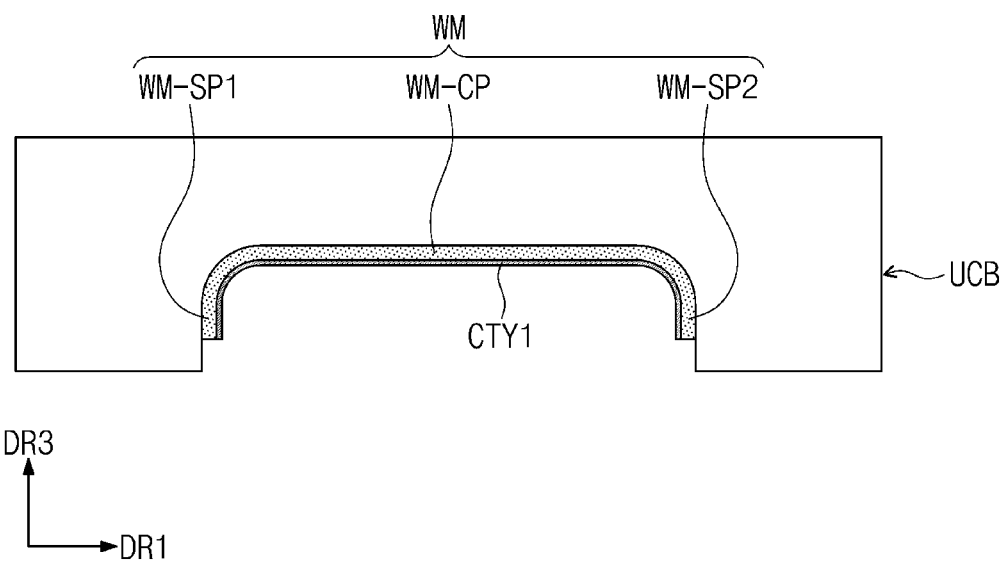
FIG. 6 is a cross-sectional view illustrating an upper chamber of the bonding device according to an exemplary embodiment of the inventive concept.

FIG. 5 is a cross-sectional view illustrating an upper chamber of the bonding device according to an exemplary embodiment of the inventive concept. FIG. 6 is a cross-sectional view illustrating an upper chamber of the bonding device according to an exemplary embodiment of the inventive concept;

Referring to FIG. 5, a window substrate WM-T and an upper chamber UCB are provided before the molding of the window substrate WM-T. The bending portions WM-SP1 to WM-SP4 of the substrate WM-T illustrated in FIG. 4A may be bent from the planar portion WM-CP by an external mechanism. Similarly, the corner banding portions WM-MP1 to WM-MP4 of the substrate WM-T illustrated in FIG. 4A may be bent from the planar portion WM-CP. Thereafter, the molded window substrate WM may be disposed on the seating surface UCB-IS of the upper chamber UCB.

Although the window substrate WM-T has been described as being molded by the external mechanism, a method of molding the window substrate WM-T is not limited thereto, and the window substrate WM-T may be molded through various methods.

Referring to FIG. 6, after the window substrate WM is disposed on the seating surface UCB-IS, a first lubrication layer CTY1 may be disposed on a rear surface of the window substrate WM. A top surface of the window substrate WM represents a surface facing the seating surface UCB-IS, and the rear surface of the window substrate WM represents a surface that is opposite to the top surface of the window substrate WM and faces the display module DM. In this specification, the first lubrication layer CTY1 may be described as an auxiliary lubrication layer.

According to exemplary embodiments of the inventive concept, the first lubrication layer CTY1 may be a layer having an oil component. In a process of bonding the display substrate DM to the window substrate WM through the adhesive member, the first lubrication layer CTY1 may prevent the adhesive member from being swept or worn down by the bending portions WM-SP1 to WM-SP4 of the window substrate WM.

As illustrated in FIG. 6, the first lubrication layer CTY1 is illustrated as being entirely disposed on the rear surface of the window substrate WM, but the present invention is not limited thereto. For example, the first lubrication layer CTY1 may be disposed only on the bending portions WM-SP1 and WM-SP2 of the window substrate WM.

The first lubrication layer CTY1 disposed on the rear surface of the window substrate WM may be absorbed by the window substrate WM or partially evaporated by external heat after a predetermined time.

Figure 7:
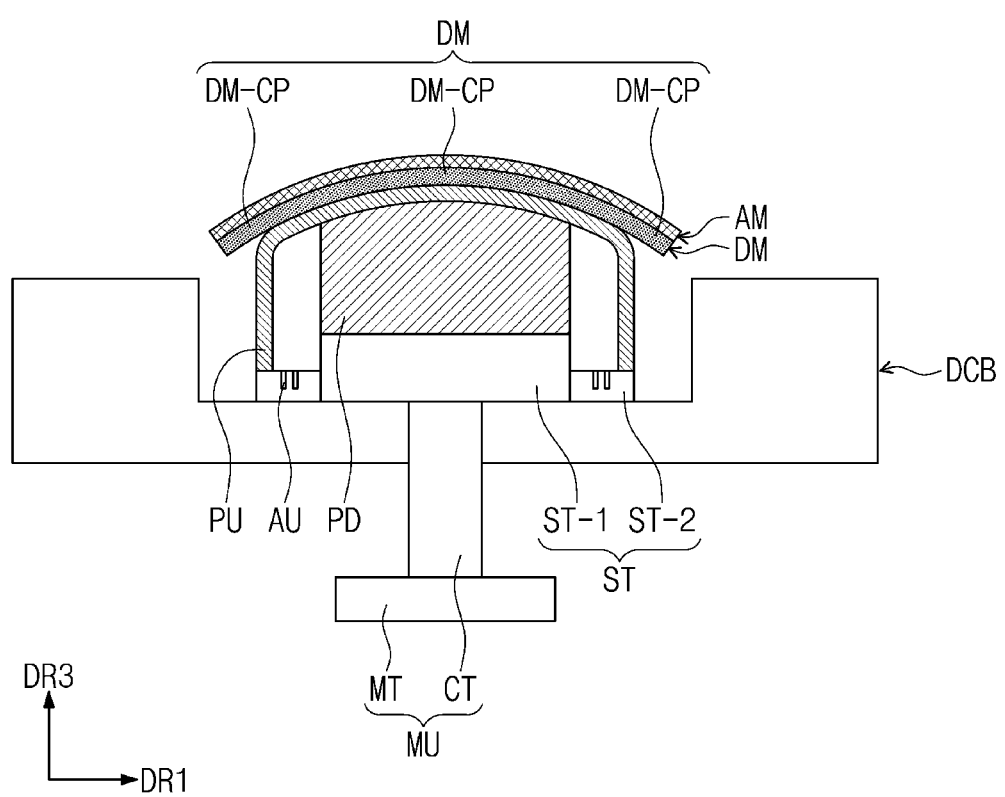
FIG. 7 is a cross-sectional view illustrating a lower chamber of the bonding device according to an exemplary embodiment of the inventive concept.
Figure 8A:
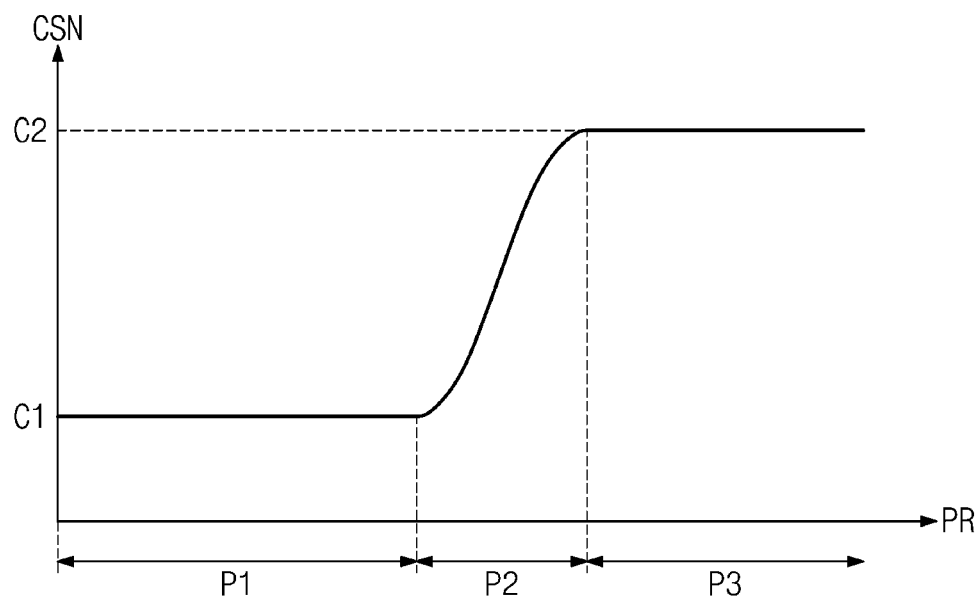
FIG. 8A is a graph illustrating viscosity of an adhesive member in relation to a temperature change according to an exemplary embodiment of the inventive concept.
Figure 8B:
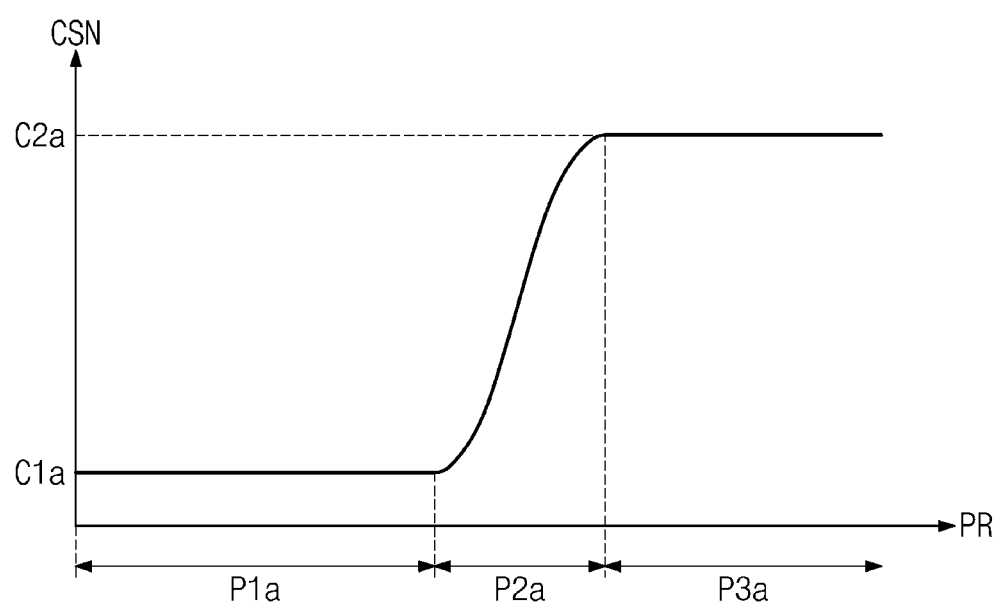
FIG. 8B is a graph illustrating viscosity of the adhesive member in relation to a pressure intensity according to an exemplary embodiment of the inventive concept.

FIG. 7 is a cross-sectional view illustrating the lower chamber of the bonding device according to an exemplary embodiment of the inventive concept. FIG. 8A is a graph illustrating viscosity of the adhesive member in relation to a temperature change according to an exemplary embodiment of the inventive concept. FIG. 8B is a graph illustrating viscosity of the adhesive member in relation to a pressure intensity according to an exemplary embodiment of the inventive concept.

Referring to FIG. 7, the stage ST, the pad PD, and the elastic film PU disposed on the lower chamber DCB and the lower chamber DCB, which are described with reference to FIG. 3, are illustrated.

According to an exemplary embodiment of the inventive concept, the display substrate DM is disposed on the elastic film PU. The display substrate DM illustrated in FIG. 7 may correspond to the display substrate DM-T having a shape before being molded as illustrated in FIG. 4B. As described above, as the display substrate DM is flexible, the display substrate DM disposed on the elastic layer PU may have a curved shape. However, the inventive concept is not limited thereto. For example, the display substrate DM may have a shape corresponding to that of the elastic film PU disposed on the pad PD.

The adhesive member AM may be disposed on the display module DM. The adhesive member AM may be disposed between the display module DM and the window substrate WM to fix the two components to each other. In this specification, the adhesive member AM may be described as an adhesive layer.

According to an exemplary embodiment of the inventive concept, the viscosity of the adhesive member AM may be changed according to pressure and temperature changes. For example, the viscosity of the adhesive member AM may be changed through external heat applied from the outside or through a pressure applied from the outside.

For example, referring to FIG. 8A, a horizontal axis represents a time PR, and a vertical axis represents a viscosity intensity CSN of the adhesive member AM.

As illustrated in FIG. 8A, the adhesive member AM may have a first temperature and be maintained at a first viscosity intensity C1 during a first period P1. For example, the first temperature may be room temperature. Thereafter, during a second period P2, external heat may be applied to the adhesive member AM. As a result, a temperature of the adhesive member AM increases above room temperature, and thus, viscosity intensity of the adhesive member AM may be controlled.

During a third period P3, the adhesive member AM may have a second temperature and be maintained at a second viscosity intensity C2 by external beat that continues for the second period P2. The second viscosity intensity C2 may be greater than the first viscosity intensity C1.

According to an exemplary embodiment of the inventive concept, when the adhesive member AM having the first viscosity intensity C1 is disposed between the window substrate WM and the display substrate DM, the window substrate WM and the display substrate DM may be movable. For example, when the window substrate WM and the display substrate DM, which are attached to the adhesive member AM, are misaligned with each other, the window substrate WM and the display substrate DM may be detached from the adhesive member AM or may be partially adjusted in position so as to perform realignment.

When the alignment of the window substrate WM and the display substrate DM, which are attached to the adhesive member AM, is completed, the first viscosity intensity C1 of the adhesive member AM may be changed to the second viscosity intensity C2 by applying heat to the adhesive member AM. When the adhesive member AM has the second viscosity intensity C2, the window substrate WM and the display substrate DM may be fixed by the adhesive member AM.

For example, the first viscosity intensity C1 of the adhesive member AM may be about 1 gf/inch to about 30 gf/inch at the first temperature, and the second viscosity intensity C2 of the adhesive member AM may be about 300 gf/inch to about 3000 gf/inch at the second temperature.

Referring to FIG. 8B, a horizontal axis represents a time PR, and a vertical axis represents a pressure intensity CSN applied to the adhesive member AM.

As illustrated in FIG. 8B, the first period may be a period for which the external pressure is not applied to the adhesive member AM. In this case, the adhesive member AM may be maintained at the first viscosity intensity C1a. Thereafter, during the second period P2a, an external pressure may be applied to the adhesive member AM. As a result, the viscosity intensity of the adhesive member AM, according to the external pressure, may be controlled. During the third period P3a, the adhesive member AM may be maintained at the second viscosity intensity C2a by the external pressure that continues for the second period P2a. The second viscosity intensity C2a may be greater than the first viscosity intensity C1a.

Similarly, according to an exemplary embodiment of the inventive concept, when the adhesive member AM having the first viscosity intensity C1a is disposed between the window substrate WM and the display substrate DM, the window substrate WM and the display substrate DM may be movable. For example, when the window substrate WM and the display substrate DM, which are attached to the adhesive member AM, are misaligned with each other, the window substrate WM and the display substrate DM may be detached from the adhesive member AM or may be partially adjusted in position so as to perform realignment.

As described above, the adhesive member AM, according to exemplary embodiments of the inventive concept, may be changed in viscosity property according to the external pressure or external heat to facilitate the realignment of the window substrate WM and the display substrate DM.

Figure 9A:
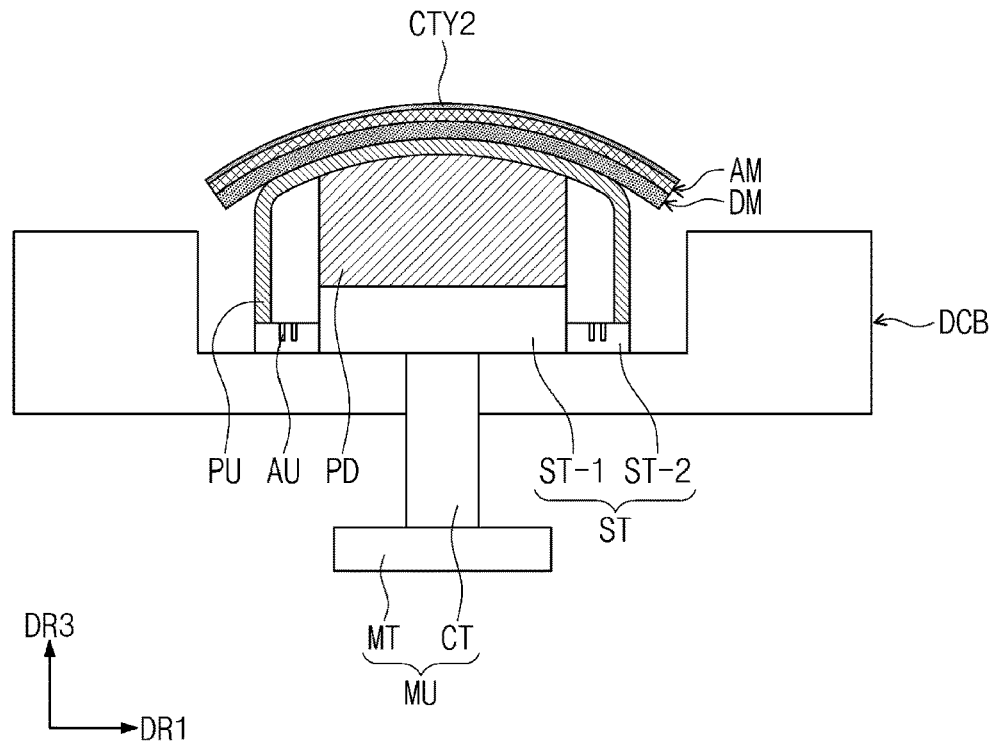
FIG. 9A is a cross-sectional view illustrating a lower chamber of the bonding device according to an exemplary embodiment of the inventive concept.
Figure 9B:
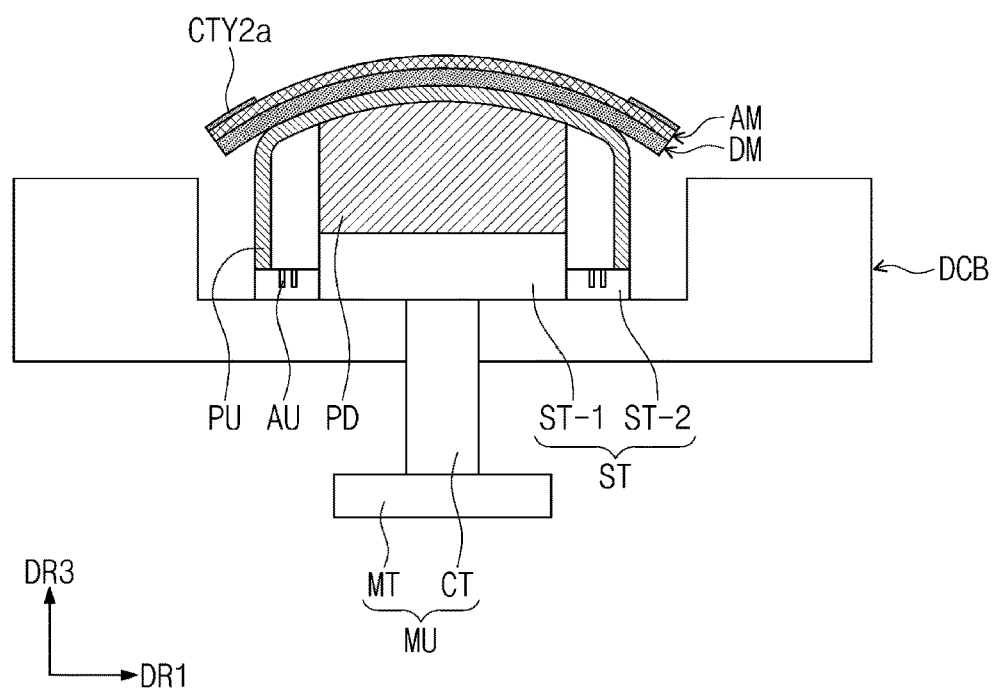
FIG. 9B is a cross-sectional view illustrating a lower chamber of a bonding device according to an exemplary embodiment of the inventive concept.

FIG. 9A is a cross-sectional view illustrating the lower chamber of the bonding device according to an exemplary embodiment of the inventive concept. FIG. 9B is a cross-sectional view illustrating a lower chamber of a bonding device according to an exemplary embodiment of the inventive concept.

Referring to FIG. 9A, a second lubrication layer CTY2 may be disposed on an upper surface of the adhesive member AM. For example, the second lubrication layer CTY2 may be disposed entirely on a top surface of the adhesive member AM. A bottom surface of the adhesive member AM represents a surface facing the display substrate DM, and the upper surface represents a surface facing the second lubrication layer CTY2.

According to an exemplary embodiment of the inventive concept, the second lubrication layer CTY2 may be a layer having an oil component. In the process of bonding the display substrate DM to the window substrate WM, the second lubrication layer CTY2 may prevent the adhesive member AM from being swept or worn down by the bending portions WM-SP1 to WM-SP4 of the window substrate WM.

The second lubrication layer CTY2 disposed on the top surface of the adhesive member AM may be absorbed by the adhesive member AM or partially evaporated by the external heat after a predetermined time.

As described above, since the second lubrication layer CTY2 is absorbed by the adhesive member AM, the adhesive member AM may be provided as a constituent including an adhesive layer having a viscosity component and a lubrication layer having an oil component. For example, the adhesive layer may at least partially overlap the window substrate WM and the display substrate DM as a whole, and the lubrication layer absorbed by the adhesive member AM may at least partially overlap at least a portion of the adhesive layer.

Referring to FIG. 9B, the second lubrication layer CTY2a may be disposed on at least a portion of the top surface of the adhesive member AM. For example, the second lubrication layer CTY2a may be disposed on the top surface of the adhesive member AM overlapping the edge portions DM-SP1 to DM-SP4 (see FIG. 4B) of the display substrate DM.

In the process of bonding the display substrate DM to the window substrate WM, the second lubrication layer CTY2 may prevent the adhesive member AM from being swept or worn down by the bending portions WM-SP1 to WM-SP4 of the window substrate WM.

FIGS. 10A to 10E are views illustrating a process of bonding a display device according to an exemplary embodiment of the inventive concept.

For example, a method for bonding the display device based on two bending portions WM-SP1 and WM-SP2 among bending portions WM-SP1 to WM-SP4 of a window substrate WM will be described with reference to FIGS. 10A to 10E. However, the inventive concept is not limited thereto. For example, a planar portion WM-CP and the bending portions WM-SP1 to WM-SP4 of the window substrate WM may be bonded to a central portion DM-CP and edge portions DM-SP1 to DM-SP4 of a display substrate DM through the method for bonding the display, which is described with reference to FIGS. 10A to 10E.

Hereinafter, for convenience of description, the banding portions WM-SP1 and WM-SP2 are described as a banding portion MW-SP, and the edge portions DM-SP1 and DM-SP2 are described as an edge portion DM-SP in FIGS. 10A to 10E.

Figure 10A:
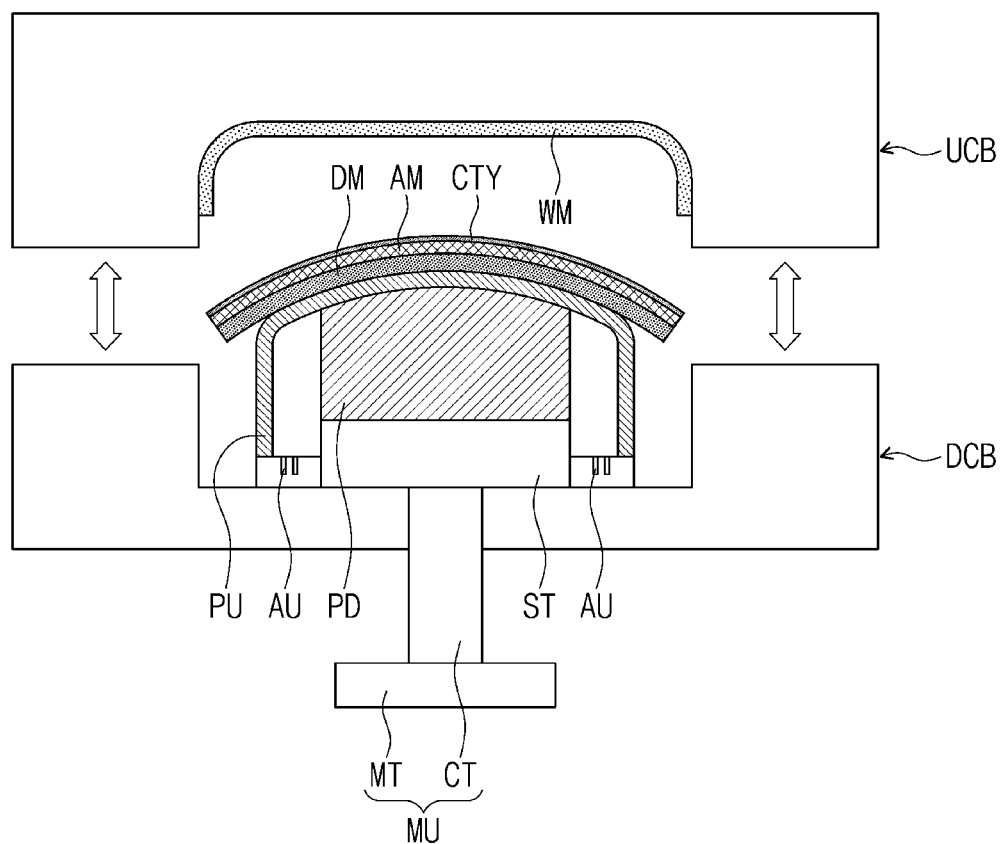
FIGS. 10A to 10E are cross-sectional views illustrating a process of bonding the display device according to an exemplary embodiment of the inventive concept.

Referring to FIG. 10A, an upper chamber UCB and a lower chamber DCB may be aligned to face each other (or face away from each other) in the third direction DR3. As a result, the window substrate WM disposed on the upper chamber UCB and the display substrate DM disposed on the lower chamber DCB may face each other (or face away from each other).

In this case, the adhesive member AM and a lubrication layer CTY may be sequentially stacked on the display substrate DM. For example, the lubrication layer CTY may correspond to the second lubrication layer CTY2 illustrated in FIG. 9A and be maintained in a state before being absorbed by the adhesive member AM.

Figure 10B:
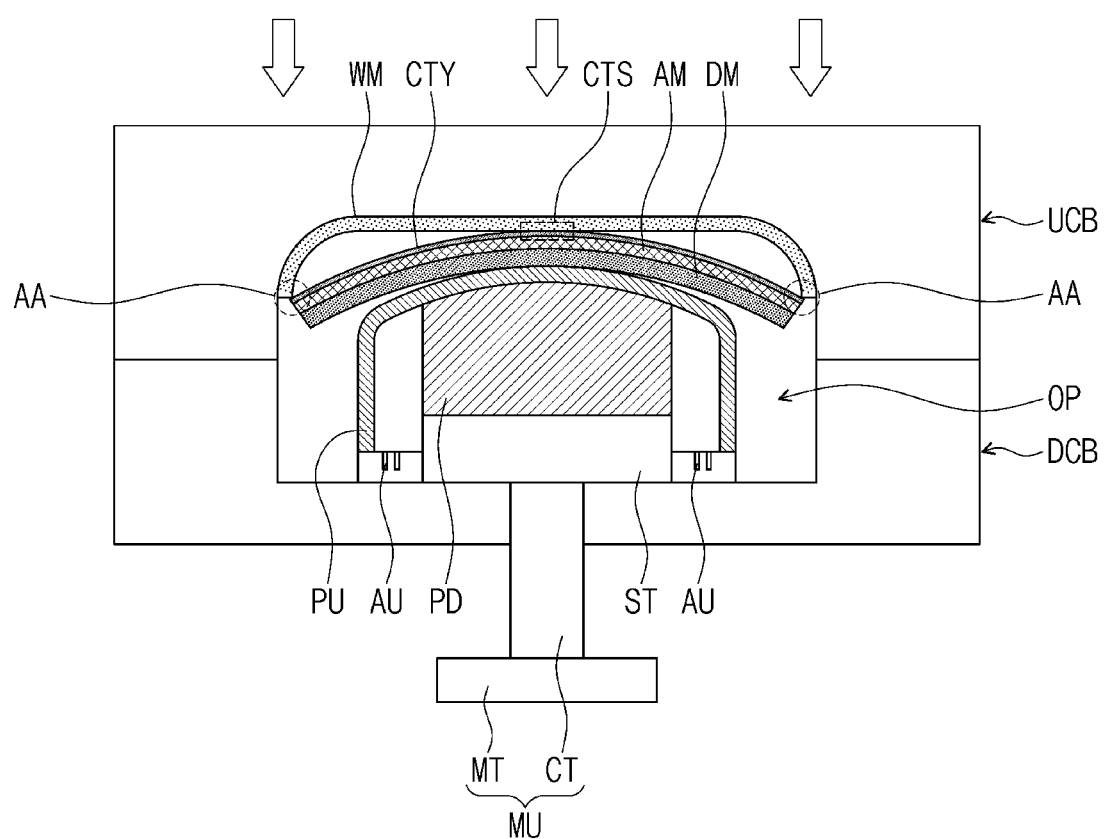

Referring to FIG. 10B, the upper chamber UCB may descend to be bonded to the lower chamber DCB. However, the inventive concept is not limited thereto. For example, the lower chamber DCB may ascend to be bonded to the upper chamber UCB. As the upper chamber UCB and the lower chamber DCB are bonded to each other, an internal space OP may be defined between the upper chamber UCB and the lower chamber DCB.

Also, as the upper chamber UCB and the lower chamber DCB are bonded to each other, a portion of the adhesive member AM may adhere to the window substrate WM. A portion of the adhesive member AM may overlap the central portion DM-CP (see FIG. 4B) of the display substrate DM. For example, a portion of the adhesive member AM may adhere to the window substrate WM by the central portion DM-CP of the display substrate DM supported by the pad PD. An area on which a portion of the adhesive member AM and a portion of the window substrate WM contact each other is described as a contact area CTS. The contact area CTS may be a reference area for alignment between the display substrate DM and the window substrate WM.

As illustrated in FIG. 10B, the other portion of the adhesive member AM overlapping the edge portion DM-SP may contact an end of the window substrate WM.

According to an exemplary embodiment of the inventive concept, a phenomenon in which another portion of the adhesive member AM is swept by the end of the window substrate WM may be prevented through the lubrication layer CTY formed on the adhesive member AM. For example, as the lubrication layer CTY is formed on the top surface of the adhesive member AM, the sweeping phenomenon between the adhesive member AM and the window substrate WM may be prevented.

Figure 10C:
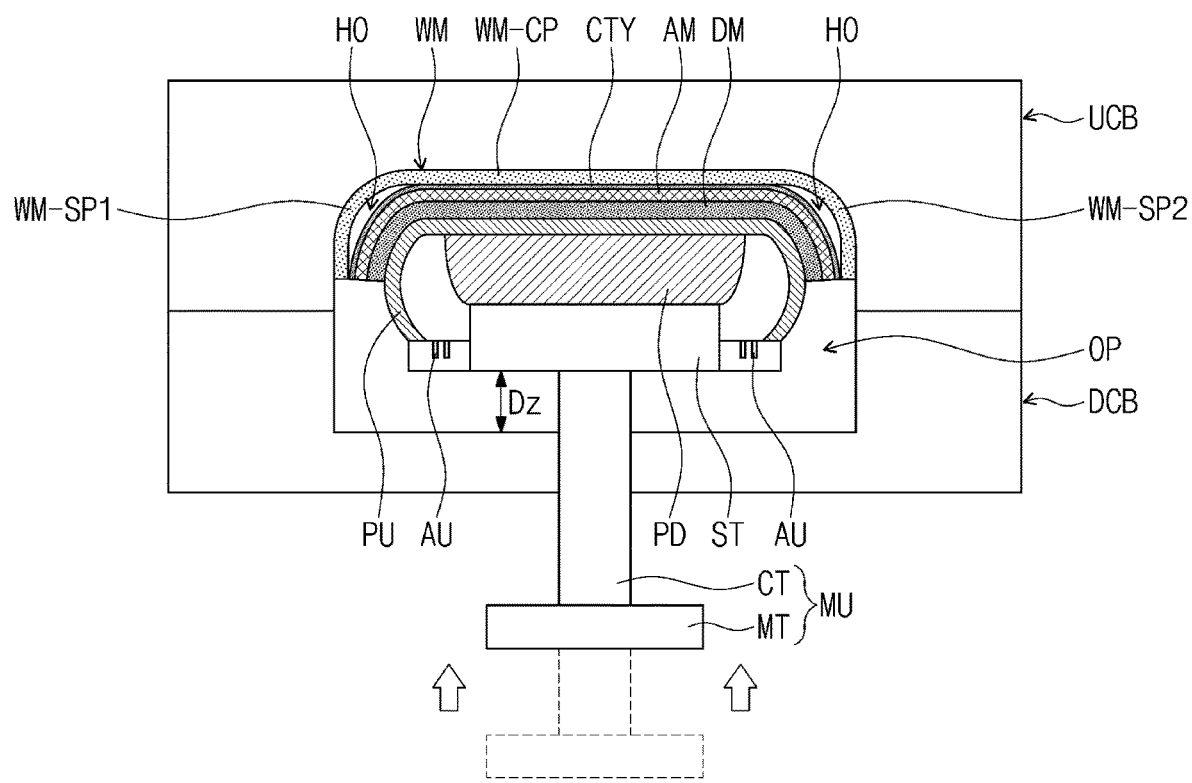

Referring to FIG. 10C, the adhesive member AM may be attached to the planar portion WM-CP of the window substrate WM by using the pad PD and the elastic film PU, which are disposed between the stage ST and the display substrate DM.

For example, the stage ST may ascend along the thickness direction of the stage ST, i.e., the third direction DR3 through the support member MU connected to a bottom surface of the stage ST. The stage ST may be spaced a predetermined distance Dz from the seating surface DCB-IS (see FIG. 3) of the lower chamber DCB. Although the stage ST ascends as both a movable part CT and a control part MT, which are provided in the support member MU ascend, the inventive concept is not limited thereto. For example, a manner in which the stage ST moves to ascend through the support member MU connected to the stage ST may be variously modified.

As the stage ST ascends, the pad PD disposed on the stage ST may also ascend. As described above, the pad PD may be made of an elastic material. The pad PD may be compressed as the stage ST ascends, and the compressed force of the pad PD may be transmitted to the display substrate DM through the elastic film PU.

For example, the elastic layer PU overlapping the planar portion WM-CP of the window substrate WM may press the display substrate DM through the compressive force of the pad PD. As a result, the adhesive member AM may adhere to the planar portion WM-CP of the window substrate WM.

In this case, a spaced space HO may occur between the bending portion WM-SP of the window substrate WM and the adhesive member AM. For example, the adhesive member AM may not be entirely attached to the bending portion WM-SP of the window substrate WM through the compressed force of the pad PD.

Figure 10D:
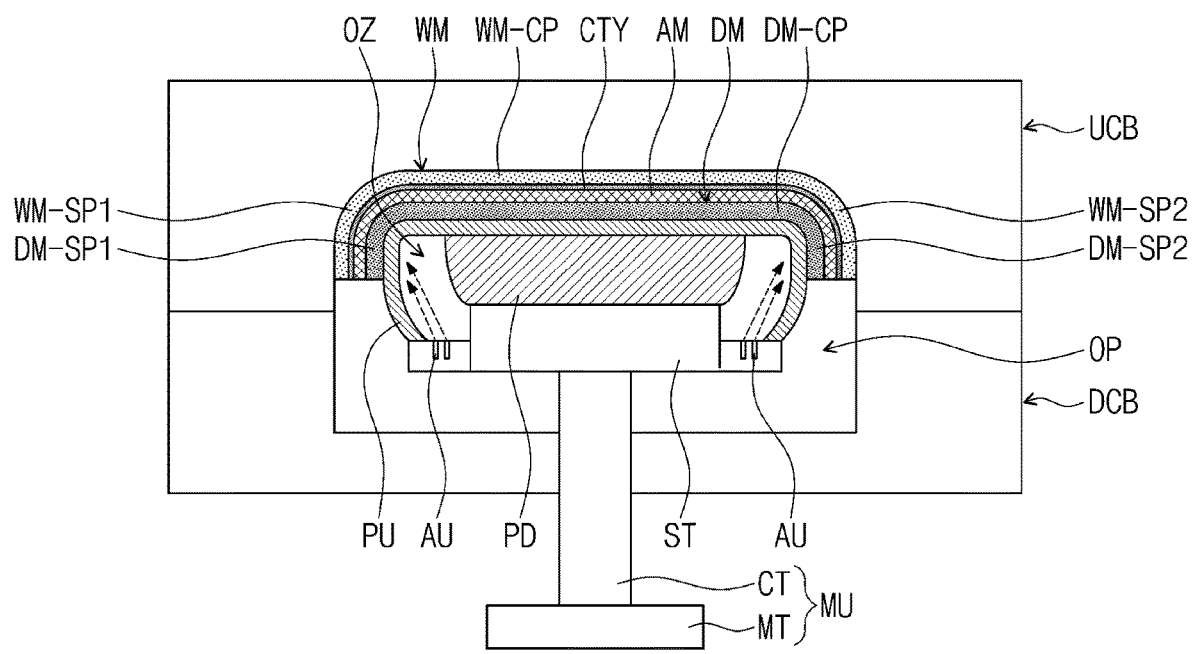

Referring to FIG. 10D, the elastic film PU may at least partially surround the pad PD and the openings AU and be fixed to the top surface of the stage ST. For example, the space between the elastic film PU and the stage ST may be sealed from the outside.

According to an exemplary embodiment of the inventive concept, air may be ejected through the openings AU defined in the top surface of the stage ST. The air ejected through the openings AU may be injected into the internal space OZ defined by the elastic film PU, the stage ST, and the pad PD. As a result, the elastic film PU may be expanded to press the edge portion DM-SP of the display substrate DM.

As the edge portion DM-SP of the display substrate DM is pressed, the adhesive member AM disposed on the edge portion DM-SP may be entirely attached to the bending portion WM-SP of the window substrate WM.

Thus, the central portion DM-CP of the display substrate DM may have a shape corresponding to the planar portion WM-CP of the window substrate WM, and the edge portion DM-SP may have a shape corresponding to the bonding portion WM-SP of the window substrate WM.

In the bonding process performed through FIGS. 10A to 10D, the adhesive member AM may have the first viscosity intensity C1 described with reference to FIG. 8A. For example, the adhesive member AM may be maintained at a first temperature. As a result, when the alignment between the display substrate DM and the window substrate WM is misaligned, realignment between the display substrate DM and the window substrate WM may be facilitated through the adhesive member AM having the first viscosity intensity C1.

Figure 10E:
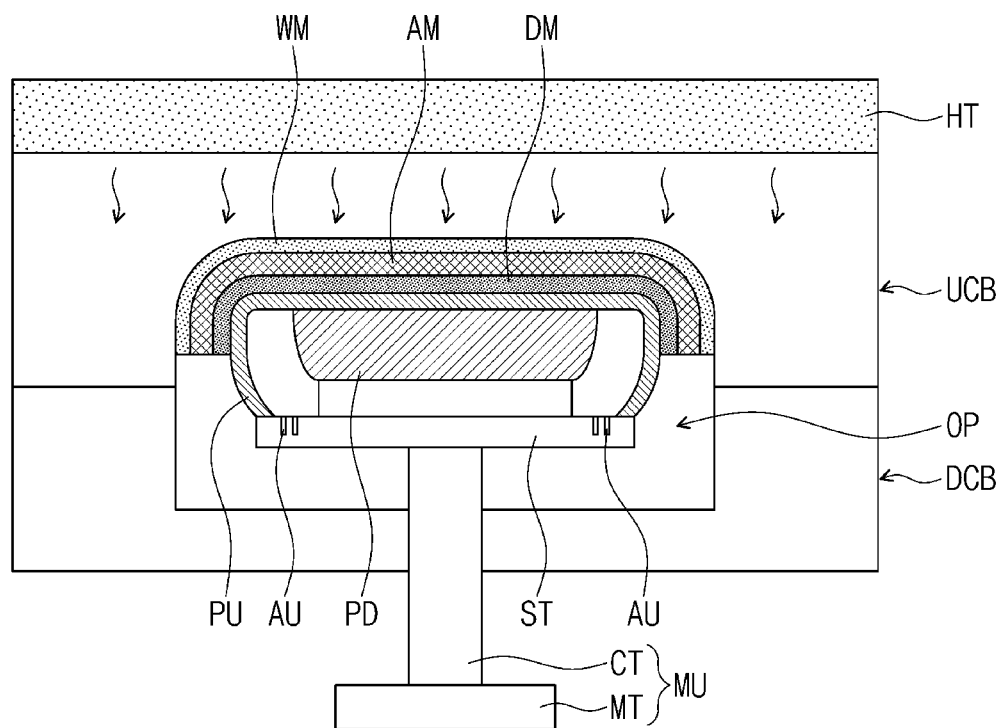

Referring to FIG. 10E, external heat may be applied to the adhesive member AM through an external heat mechanism HT. As a result, the adhesive member AM having the first viscosity intensity C1 may be changed to an adhesive member AM having a second viscosity intensity C2 that is greater than the first viscosity intensity C1.

Adhesion force between the window substrate WM and the display substrate. DM may be increased through the adhesive member AM having the above-described second viscosity intensity C2.

Figure 11:
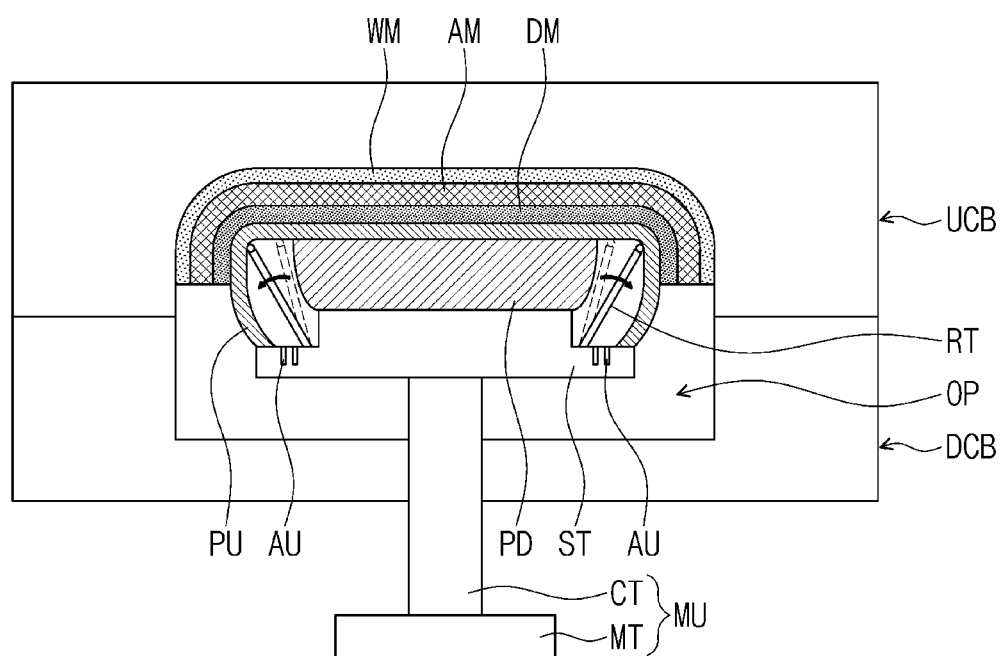
FIG. 11 is a cross-sectional view illustrating a process of bonding the display device according to an exemplary embodiment of the inventive concept.

FIG. 11 is a cross-sectional view illustrating a process of bonding the display device according to an exemplary embodiment of the inventive concept.

Referring to FIG. 11, the bonding device may further include a roller RT. According to an exemplary embodiment of the inventive concept, the roller RT may be disposed on a stage ST and be disposed in an internal space OZ described in FIG. 10D.

As an elastic film PU is pressed through the roller RT, an edge portion DM-SP of a display substrate DM may be pressed. As a result, an adhesive member AM may be more efficiently attached to a bending portion WM-SP of a window substrate WM.

According to the exemplary embodiment of the inventive concept, the phenomenon in which a portion of the adhesive member is swept by the end of the window substrate through the lubrication layer disposed on the adhesive member may be prevented. For example, since the lubrication layer is disposed on the top surface of the adhesive member, the sweeping phenomenon between the adhesive member and the window substrate may be prevented.

Also, the adhesive member may be changed in viscosity property according to the pressure and temperature changes. For example, the adhesive member may be changed in viscosity property through the external heat applied from the outside or changed in viscosity property through the pressure applied from the outside. Therefore, the alignment between the display substrate and the window substrate may be facilitated.

What is claimed is:

1. A method for bonding a display device, the method comprising:
    disposing a display substrate, comprising a central portion and an edge portion adjacent to the central portion, on a pad disposed on a stage;
    forming a lubrication layer on the display substrate;
    forming an adhesive layer on the lubrication layer;
    providing a window substrate comprising a planar portion and a bending portion that is bent from the planar portion;
    aligning the window substrate with the display substrate;
    attaching the adhesive layer to the window substrate; and
    applying heat to the adhesive layer,
    wherein viscosity of the adhesive layer increases during a first period for which a temperature of the adhesive layer increases from a first temperature to a second temperature.

2. The method of claim 1, wherein the central portion is pressed through the pad disposed between the display substrate and the stage.

3. The method of claim 2, further comprising ejecting air through a plurality of openings defined in a top surface of the stage,
    wherein the edge portion is pressed through an elastic film, which at least partially surrounds the pad and the openings, is disposed between the stage and the display substrate, and is expanded by the ejected air.

4. The method of claim 2, wherein the edge portion is pressed through a roller disposed on the stage so as to be adjacent to the pad.

5. The method of claim 1, wherein the lubrication layer is absorbed to the adhesive layer after a predetermined period of time.

6. The method of claim 5, wherein the predetermined period of time is before a time at which the heat is applied to the adhesive layer.

7. The method of claim 1, further comprising pressing the display substrate through the pad disposed between the display substrate and the stage,
wherein the pressing of the display substrate through the pad comprises:
pressing the display substrate through the pad;
pressing the display substrate at a first intensity for the first period; and
pressing the display substrate at a second intensity greater than the first intensity for a second period after the first period.

8. The method of claim 7, wherein viscosity intensity of the adhesive layer increases from the first intensity to the second intensity.

9. The method of claim 1, wherein a viscosity intensity of the adhesive layer ranges from 1 gf/inch to 30 gf/inch at the first temperature, and from 300 gf/inch to 3,000 gf/inch at the second temperature.

10. The method of claim 1, further comprising forming an auxiliary lubrication layer on a rear surface of the window substrate facing the display substrate.

11. A method for bonding a display device, the method comprising:
providing a window substrate comprising a planar portion and a bending portion that is bent from the planar portion;
forming a first lubrication layer on a rear surface of the window substrate;
disposing a display substrate, comprising a central portion and an edge portion adjacent to the central portion, on a pad disposed on a stage;
forming an adhesive member, comprising an adhesive layer and a second lubrication layer, on the display substrate;
attaching the central portion to the planar portion; and
attaching the edge portion to the bending portion,
wherein the first lubrication layer formed on the window substrate comes into direct contact with the adhesive member.

12. The method of claim 11, wherein the first lubrication layer is absorbed by the window substrate or partially evaporated by heat after the display substrate is attached to the window substrate.

13. The method of claim 11, wherein the first lubrication layer is formed only on the bending portion of the window substrate and not on the planar portion.

14. The method of claim 11, wherein a viscosity of the adhesive layer increases during a period for which a temperature of the adhesive layer is increases.

* * * * *